(12) United States Patent
Lai et al.

(10) Patent No.: US 11,349,336 B2
(45) Date of Patent: May 31, 2022

(54) METHOD FOR OPERATING POWER FACTOR CORRECTION CIRCUIT AND METHOD FOR OPERATING UNINTERRUPTIBLE POWER SUPPLY APPARATUS

(71) Applicant: DELTA ELECTRONICS, INC., Taoyuan (TW)

(72) Inventors: Yuan-Fang Lai, Taoyuan (TW); Hung-Chieh Lin, Taoyuan (TW); Chao-Li Kao, Taoyuan (TW); Chao-Lung Kuo, Taoyuan (TW); Hsin-Chih Chen, Taoyuan (TW); Yi-Ping Hsieh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/131,789

(22) Filed: Dec. 23, 2020

(65) Prior Publication Data

US 2021/0281164 A1 Sep. 9, 2021

Related U.S. Application Data

(60) Provisional application No. 62/984,312, filed on Mar. 3, 2020.

(51) Int. Cl.
*H02J 9/00* (2006.01)
*H02M 1/42* (2007.01)
(Continued)

(52) U.S. Cl.
CPC ............ *H02J 9/063* (2020.01); *H02J 7/0068* (2013.01); *H02J 9/061* (2013.01);
(Continued)

(58) Field of Classification Search
USPC .......................................................... 307/66
See application file for complete search history.

(56) References Cited

U.S. PATENT DOCUMENTS

| | | | |
|---|---|---|---|
| 8,884,464 B2 | 11/2014 | Jayaraman et al. | |
| 2013/0049699 A1* | 2/2013 | Jayaraman ............ | H02M 5/458 320/137 |

(Continued)

FOREIGN PATENT DOCUMENTS

| | | |
|---|---|---|
| CN | 104167809 A | 11/2014 |
| CN | 105071524 A | 11/2015 |

(Continued)

*Primary Examiner* — Rexford N Barnie
*Assistant Examiner* — Xuan Ly
(74) *Attorney, Agent, or Firm* — CKC & Partners Co., LLC

(57) ABSTRACT

A method for operating a power factor correction (PFC) circuit of an uninterruptible power supply (UPS) apparatus is provided. The PFC circuit includes two T-type converters, and each of the T-type converters includes four switching tubes. The method includes: converting AC input voltage into a positive bus voltage across a first capacitor and a negative bus voltage across a second capacitor that is connected in series with the first capacitor when the UPS apparatus is operated under a normal supply mode; and controlling conduction states of the switching tubes of the T-type converters to balance the positive bus voltage and the negative bus voltage when the UPS apparatus is operated under a battery supply mode.

16 Claims, 8 Drawing Sheets

(51) Int. Cl.
*H02J 9/06* (2006.01)
*H02J 7/00* (2006.01)
*H02M 7/219* (2006.01)
*H02M 7/44* (2006.01)
*H02M 1/00* (2006.01)

(52) U.S. Cl.
CPC ......... *H02M 1/4233* (2013.01); *H02M 7/219* (2013.01); *H02M 7/44* (2013.01); *H02M 1/007* (2021.05)

(56) References Cited

U.S. PATENT DOCUMENTS

2015/0054343 A1 2/2015 Cui
2016/0344233 A1 11/2016 Paatero et al.

FOREIGN PATENT DOCUMENTS

| CN | 104167809 B | 8/2016 |
| CN | 105071524 B | 1/2018 |
| CN | 110556912 A | 12/2019 |
| EP | 2846436 A1 | 3/2015 |

\* cited by examiner

METHOD FOR OPERATING POWER FACTOR CORRECTION CIRCUIT AND METHOD FOR OPERATING UNINTERRUPTIBLE POWER SUPPLY APPARATUS

RELATED APPLICATIONS

This application claims priority to U.S. Provisional Application Ser. No. 62/984,312, filed Mar. 3, 2020, the disclosures of which are incorporated herein by reference in their entireties.

BACKGROUND

Field of Invention

The present invention relates to a method for operating a power factor correction (PFC) circuit of an uninterruptible power supply (UPS) apparatus. More particularly, the present invention relates to a method for operating a PFC circuit and a method for operating an UPS apparatus.

Description of Related Art

The existing UPS products generally adopt a split bus topology in which a single battery pack is connected. Under the battery supply mode, maintaining the balance between the positive and negative bus voltages just by the DC-DC converting circuit has its limits. In order to maintain the balance between the positive and negative bus voltages, the balance of the positive and negative bus voltages is usually maintained by adding a balancing circuit. However, the additional balancing circuit not only increases the cost but also increases the circuit.

SUMMARY

The present invention provides a method for operating a power factor correction (PFC) circuit of an uninterruptible power supply (UPS) apparatus. The PFC circuit includes two T-type converters, and each of the T-type converters includes four switching tubes. The method includes: converting AC input voltage into a positive bus voltage across a first capacitor and a negative bus voltage across a second capacitor that is connected in series with the first capacitor when the UPS apparatus is operated under a normal supply mode; and controlling conduction states of the switching tubes of the T-type converters to balance the positive bus voltage and the negative bus voltage when the UPS apparatus is operated under a battery supply mode.

In accordance with one or more embodiments of the invention, a first T-type converter of the T-type converters includes a first switching tube and a second switching tube which are connected in series, and a series connection of the first switching tube and the second switching tube is connected in parallel with a series connection of the first capacitor and the second capacitor. The first T-type converter further includes a third switching tube and a fourth switching tube which are connected in series between a first inductor and a midpoint between the first capacitor and the second capacitor. The method further includes: controlling the first switching tube and the second switching tube to be turned off and controlling the third switching tube and the fourth switching tube to be turned on when the UPS apparatus is operated under the battery supply mode.

In accordance with one or more embodiments of the invention, a duration during the UPS apparatus operated under the battery supply mode includes a first duration and a second duration. The method further includes: adjusting the first duration and the second duration to balance the positive bus voltage and the negative bus voltage when the UPS apparatus is operated under the battery supply mode.

In accordance with one or more embodiments of the invention, a second T-type converter of the T-type converters includes a fifth switching tube and a sixth switching tube which are connected in series, and a series connection of the fifth switching tube and the sixth switching tube is connected in parallel with the series connection of the first capacitor and the second capacitor. The second T-type converter further includes a seventh switching tube and an eighth switching tube which are connected in series between the midpoint and a second inductor. The method further includes: controlling the fifth switching tube to be turned on and controlling the sixth switching tube and the seventh switching tube to be turned off during the first duration when the UPS apparatus is operated under the battery supply mode.

In accordance with one or more embodiments of the invention, the method further includes: controlling the fifth switching tube and the eight switching tube to be turned off and controlling the sixth switching tube to be turned on during the second duration when the UPS apparatus is operated under the battery supply mode.

In accordance with one or more embodiments of the invention, the method further includes: increasing the first duration when the positive bus voltage is larger than the negative bus voltage.

In accordance with one or more embodiments of the invention, the method further includes: increasing the second duration when the positive bus voltage is less than the negative bus voltage.

The present invention further provides a method for operating an UPS apparatus. The UPS apparatus includes a PFC circuit, a DC-DC converting circuit, and an inverter circuit coupled to the PFC circuit and the DC-DC converting circuit. The PFC circuit includes two T-type converters, and each of the T-type converters includes four switching tubes. The method includes: converting, by the PFC circuit, AC input voltage into a positive bus voltage across a first capacitor and a negative bus voltage across a second capacitor that is connected in series with the first capacitor and converting, by the inverter circuit, the positive bus voltage and the negative bus voltage into AC output voltage when the UPS apparatus is operated under a normal supply mode; converting, by the DC-DC converting circuit, DC input voltage into the positive and negative bus voltages and converting, by the inverter circuit, the positive bus voltage and the negative bus voltage into the AC output voltage when the UPS apparatus is operated under a battery supply mode; and controlling conduction states of the switching tubes of the T-type converters to balance the positive bus voltage and the negative bus voltage when the UPS apparatus is operated under the battery supply mode.

In accordance with one or more embodiments of the invention, a first T-type converter of the T-type converters includes a first switching tube and a second switching tube which are connected in series, and a series connection of the first switching tube and the second switching tube is connected in parallel with a series connection of the first capacitor and the second capacitor. The first T-type converter further includes a third switching tube and a fourth switching tube which are connected in series between a first inductor and a midpoint between the first capacitor and the second capacitor. The method further includes: controlling the first switching tube and the second switching tube to be turned off and controlling the third switching tube and the fourth switching tube to be turned on when the UPS apparatus is operated under the battery supply mode.

In accordance with one or more embodiments of the invention, a duration during the UPS apparatus operated under the battery supply mode includes a first duration and a second duration. The method further includes: adjusting the first duration and the second duration to balance the positive bus voltage and the negative bus voltage when the UPS apparatus is operated under the battery supply mode.

In accordance with one or more embodiments of the invention, a second T-type converter of the T-type converters includes a fifth switching tube and a sixth switching tube which are connected in series, and a series connection of the fifth switching tube and the sixth switching tube is connected in parallel with the series connection of the first capacitor and the second capacitor. The second T-type converter further includes a seventh switching tube and an eighth switching tube which are connected in series between the midpoint and a second inductor. The method further includes: controlling the fifth switching tube to be turned on and controlling the sixth switching tube and the seventh switching tube to be turned off during the first duration when the UPS apparatus is operated under the battery supply mode.

In accordance with one or more embodiments of the invention, the method further includes: controlling the fifth switching tube and the eight switching tube to be turned off and controlling the sixth switching tube to be turned on during the second duration when the UPS apparatus is operated under the battery supply mode.

In accordance with one or more embodiments of the invention, the method further includes: increasing the first duration when the positive bus voltage is larger than the negative bus voltage.

In accordance with one or more embodiments of the invention, the method further includes: increasing the second duration when the positive bus voltage is less than the negative bus voltage.

In accordance with one or more embodiments of the invention, the PFC circuit further includes a relay coupled between a commercial AC power supply for supplying the AC input voltage and the first and second inductors. The method further includes: turning off the relay when the UPS apparatus is operated under the battery supply mode.

In accordance with one or more embodiments of the invention, the UPS apparatus further includes a balance circuit coupled to the PFC circuit, the DC-DC converting circuit and the inverter circuit. The method further includes: balancing the positive bus voltage and the negative bus voltage via the balance circuit during a transition time for turning off the relay.

BRIEF DESCRIPTION OF THE DRAWINGS

The disclosure can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size. The using of "first", "second", "third", etc. in the specification should be understood for identify units or data described by the same terminology, but are not referred to particular order or sequence.

Figure 1:
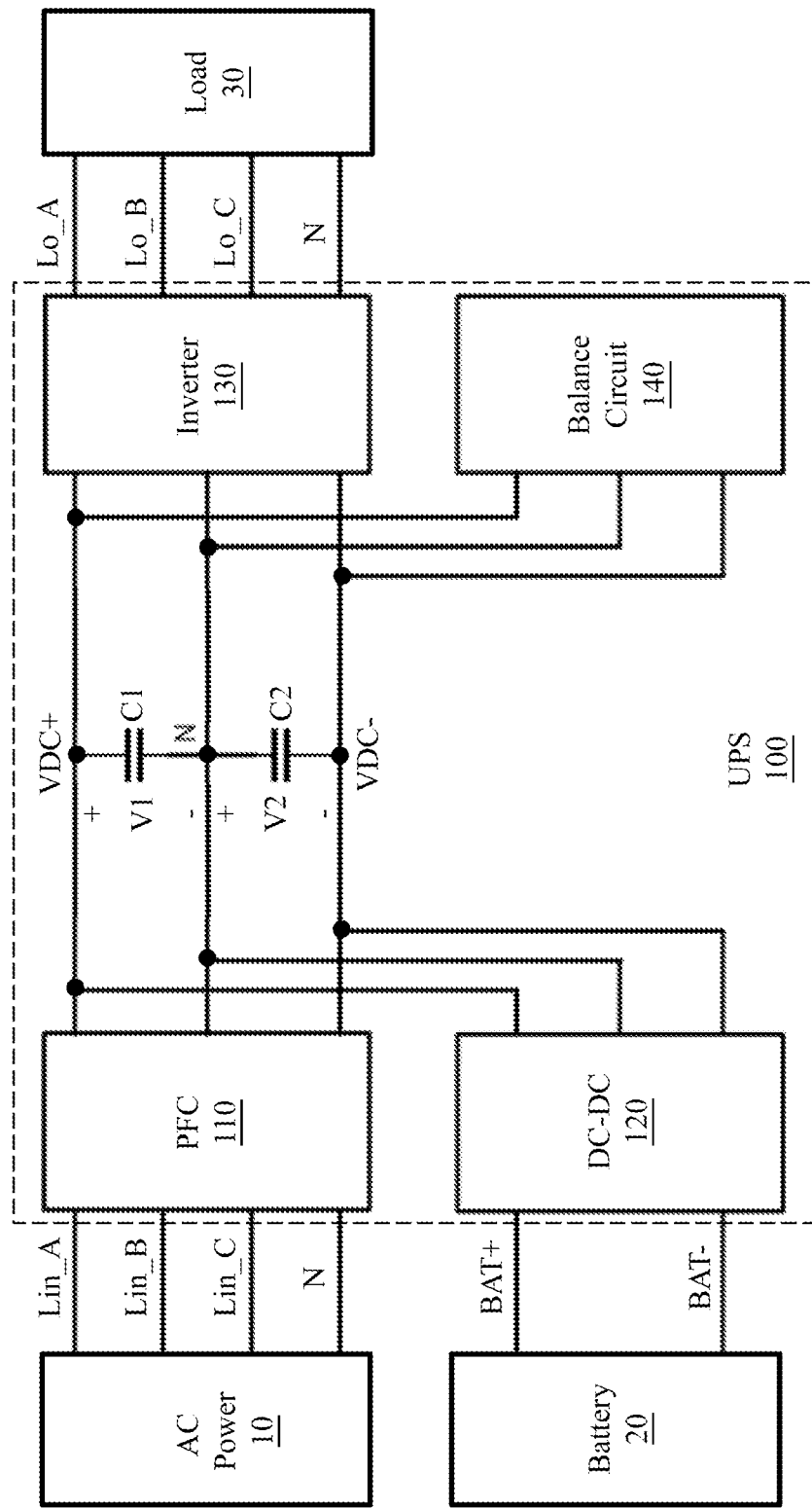
FIG. 1 illustrates a circuit diagram of an uninterruptible power supply (UPS) apparatus according to some embodiments of the present invention.

FIG. 1 illustrates a circuit diagram of an uninterruptible power supply (UPS) apparatus 100 according to some embodiments of the present invention. The UPS apparatus 100 as shown in FIG. 1 is a three-phase UPS apparatus. The UPS apparatus 100 includes a power factor correction (PFC) circuit 110, a DC-DC converting circuit 120, an inverter circuit 130, and a balance circuit 140. The inverter circuit 130 is coupled to the PFC circuit 110 and the DC-DC converting circuit 120. The balance circuit 140 is coupled to the PFC circuit 110, the DC-DC converting circuit 120, and the inverter circuit 130.

When a commercial alternating current (AC) power supply 10 is operating normally, the UPS apparatus 100 is operated under a normal supply mode, such that the PFC circuit 110 converts the AC input voltage (i.e., three phase AC input voltages Lin_A, Lin_B, and Lin_C which are supplied by the commercial AC power supply 10 as shown in FIG. 1) into a positive bus voltage V1 (i.e., the voltage difference between a first terminal VDC+ and a midpoint N) across a first capacitor C1 and a negative bus voltage V2 (i.e., the voltage difference between the midpoint N and a second terminal VDC−) across a second capacitor C2 that is connected in series with the first capacitor C1, and then the inverter circuit 130 converts the positive bus voltage V1 and the negative bus voltage V2 into the AC output voltage (i.e., three phase AC output voltage Lo_A, Lo_B, and Lo_C as shown in FIG. 1) and transmits the AC output voltage to a load 30.

When the commercial AC power supply 10 is abnormal, the UPS apparatus 100 is operated under a battery supply mode, such that the DC-DC converting circuit 120 converts the DC input voltage (i.e., the voltage difference between the DC terminals BAT+ and BAT− which are supplied by a battery 20 as shown in FIG. 1) into the positive bus voltage V1 and the negative bus voltage V2, and then the inverter circuit 130 converts the positive bus voltage V1 and the negative bus voltage V2 into the AC output voltage and transmits the AC output voltage to the load 30.

The existing UPS apparatus requires the balance circuit to balance the positive bus voltage and the negative bus voltage when the existing UPS apparatus is operated under the battery supply mode. However, the additional balancing circuit not only increases the cost but also increases the circuit. Therefore, the present invention is intended to utilize the PFC circuit 110 for balancing the positive bus voltage V1 and the negative bus voltage V2 when the UPS apparatus 100 is operated under the battery supply mode.

Figure 2:
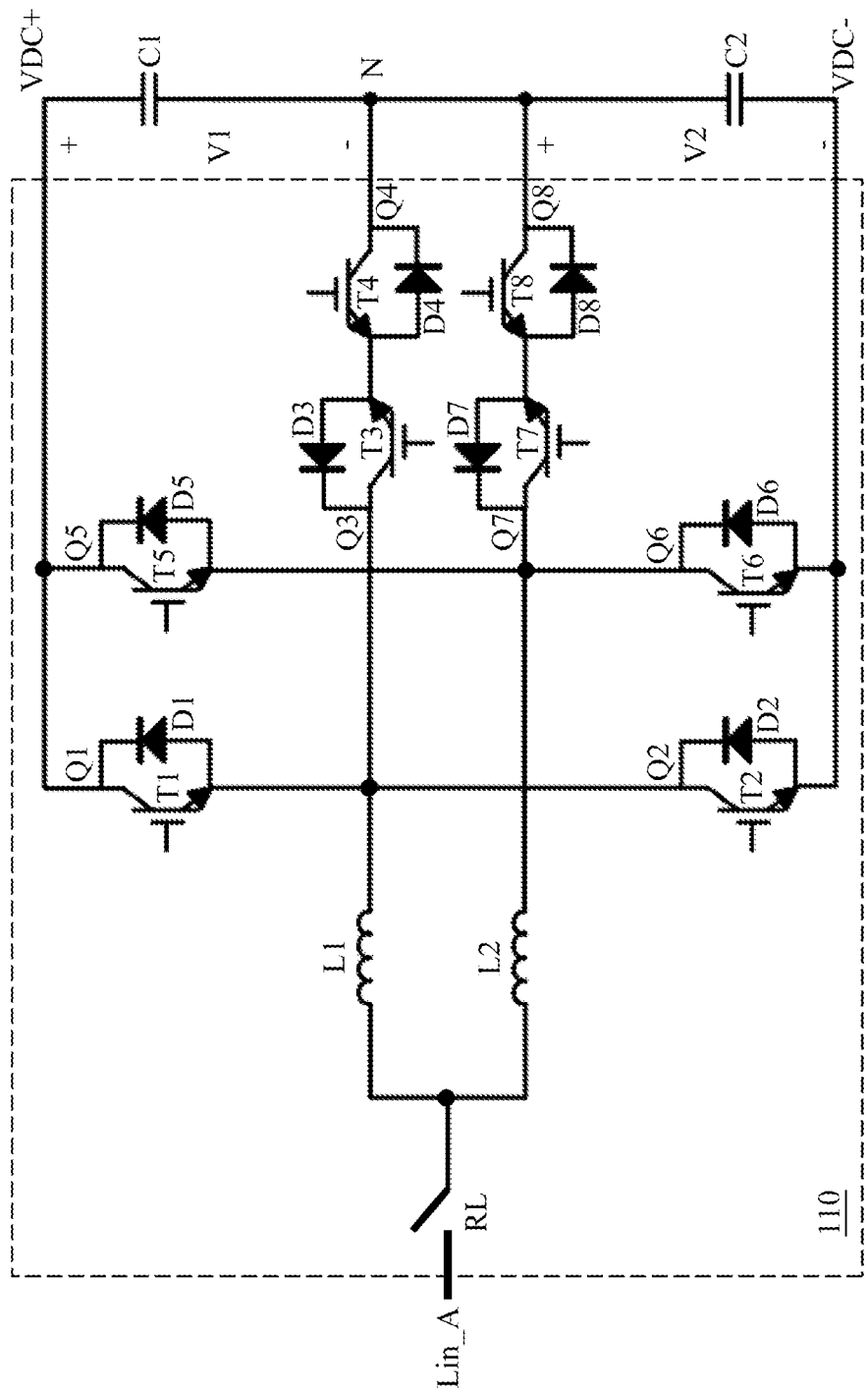
FIG. 2 illustrates a circuit diagram of a power factor correction (PFC) circuit of the UPS apparatus according to some embodiments of the present invention.

FIG. 2 illustrates a circuit diagram of the PFC circuit 110 of the UPS apparatus 100 according to some embodiments of the present invention. The PFC circuit 110 includes a first T-type converter and a second T-type converter. The first T-type converter is composed of four switching tubes Q1,Q2, Q3, and Q4, and the second T-type converter is composed of four switching tubes Q5,Q6, Q7, and Q8. It is noted that, the PFC circuit 110 as shown in FIG. 2 is a single-phase circuitry, and the input of the PFC circuit 110 as shown in FIG. 2 is a single-phase AC input voltages Lin_A. The three-phase PFC circuit will be presented in FIG. 5 afterwards.

The switching tubes may include a metal-oxide-semiconductor field effect transistor (MOSFET), a gallium nitride (GaN), or a bipolar transistor (BJT), but not limited to this. In some embodiments of the present invention, each of the switching tubes Q1-Q8 includes an insulated gate bipolar transistor (IGBT). As shown in FIG. 2, the switching tube Q1 includes a switch T1 and a diode D1 connected in parallel with the switch T1, and the diode D1 is used for providing a freewheeling current path when the switch T1 turns off. Similarly, the switching tube Q2 includes a switch T2 and a diode D2 connected in parallel with the switch T2, the switching tube Q3 includes a switch T3 and a diode D3 connected in parallel with the switch T3, the switching tube Q4 includes a switch T4 and a diode D4 connected in parallel with the switch T4, the switching tube Q5 includes a switch T5 and a diode D5 connected in parallel with the switch T5, the switching tube Q6 includes a switch T6 and a diode D6 connected in parallel with the switch T6, the switching tube Q7 includes a switch T7 and a diode D7 connected in parallel with the switch T7, and the switching tube Q8 includes a switch T8 and a diode D8 connected in parallel with the switch T8.

Regarding the first T-type converter, as shown in FIG. 2, the switching tube Q1 is connected in series with the switching tube Q2, and the switching tube Q1 is coupled between the first terminal VDC+ of the capacitor C1 and a first inductor L1 that is connected to the commercial AC power supply 10, and the switching tube Q2 is coupled between the first inductor L1 and the second terminal VDC− of the capacitor C2. In other words, a series connection of the first switching tube Q1 and the second switching tube Q2 is connected in parallel with a series connection of the first capacitor C1 and the second capacitor C2.

Regarding the first T-type converter, as shown in FIG. 2, the switching tube Q3 is counter connected in series with the switching tube Q4, and the switching tube Q3 is coupled between the first inductor L1 and the switching tube Q4, and the switching tube Q4 is coupled between the switching tube Q3 and a midpoint N between the capacitor C1 and the capacitor C2. It is noted that the midpoint N is coupled to a neutral line.

Regarding the second T-type converter, as shown in FIG. 2, the switching tube Q5 is connected in series with the switching tube Q6, and the switching tube Q5 is coupled between the first terminal VDC+ of the capacitor C1 and a second inductor L2 that is connected to the commercial AC power supply 10, and the switching tube Q6 is coupled between the second inductor L2 and the second terminal VDC− of the capacitor C2. In other words, a series connection of the first switching tube Q5 and the second switching tube Q6 is connected in parallel with a series connection of the first capacitor C1 and the second capacitor C2.

Regarding the second T-type converter, as shown in FIG. 2, the switching tube Q7 is counter connected in series with the switching tube Q8, and the switching tube Q7 is coupled between the second inductor L2 and the switching tube Q8, and the switching tube Q8 is coupled between the switching tube Q7 and the midpoint N between the capacitor C1 and the capacitor C2.

When the UPS apparatus 100 is operated under the battery supply mode, the PFC circuit 110 is utilized for balancing the positive bus voltage V1 and the negative bus voltage V2 by controlling conduction states of the switching tubes Q1-Q8. The said balance of the positive bus voltage V1 and the negative bus voltage V2 means that the positive bus voltage V1 is close to or even equal to the negative bus voltage V2.

Figure 3:
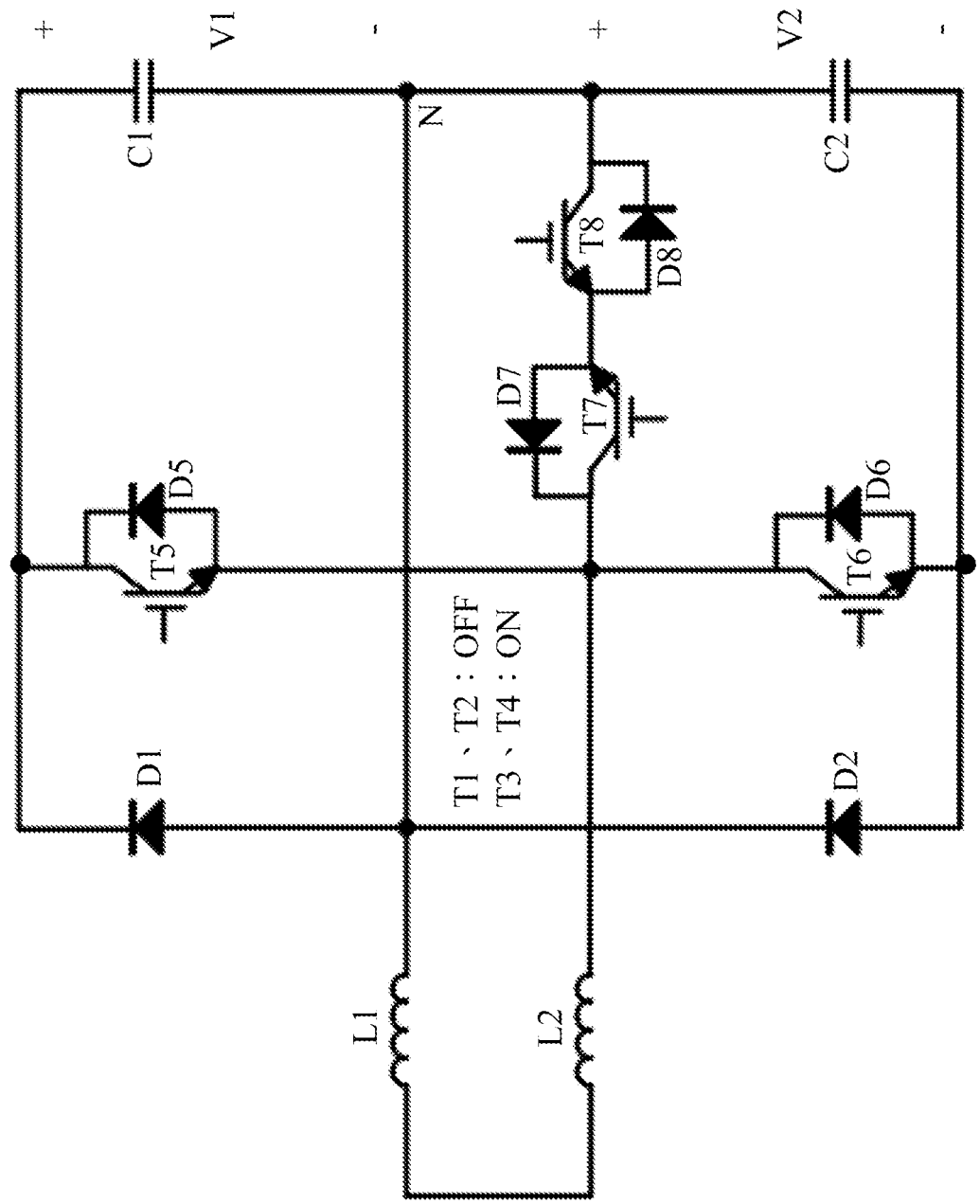
FIG. 3 illustrates an equivalent circuit diagram of the PFC circuit when the UPS apparatus is operated under a battery supply mode according to some embodiments of the present invention.

In some embodiments of the present invention, when the UPS apparatus 100 is operated under the battery supply mode, the PFC circuit 110 is controlled to turn off the switches T1 and T2 and to turn on the switches T3 and T4. It is noted that control signals is applied on the switches T1-T4 for controlling the conduction states of the switches T1-T4. FIG. 3 illustrates an equivalent circuit diagram of the PFC circuit 110 when the UPS apparatus 100 is operated under the battery supply mode according to some embodiments of the present invention. The equivalent circuit as shown in FIG. 3 is used for balancing the positive bus voltage V1 and the negative bus voltage V2 when the UPS apparatus 100 is operated under the battery supply mode.

In some embodiments of the present invention, when the UPS apparatus 100 is operated under the battery supply mode, the duration for operating the equivalent circuit as shown in FIG. 3 includes a first duration and a second duration. During the first duration, the equivalent circuit as shown in FIG. 3 is controlled to turn on the switch T5 and to turn off the switches T6 and T7, in which the switch T8 could be controlled to be turned on or turned off. During the second duration, the equivalent circuit as shown in FIG. 3 is controlled to turn off the switches T5 and T8 and to turn on the switch T6, in which the switch T7 could be controlled to be turned on or turned off. It is noted that control signals is applied on the switches T5-T8 for controlling the conduction states of the switches T5-T8.

Figure 4A:
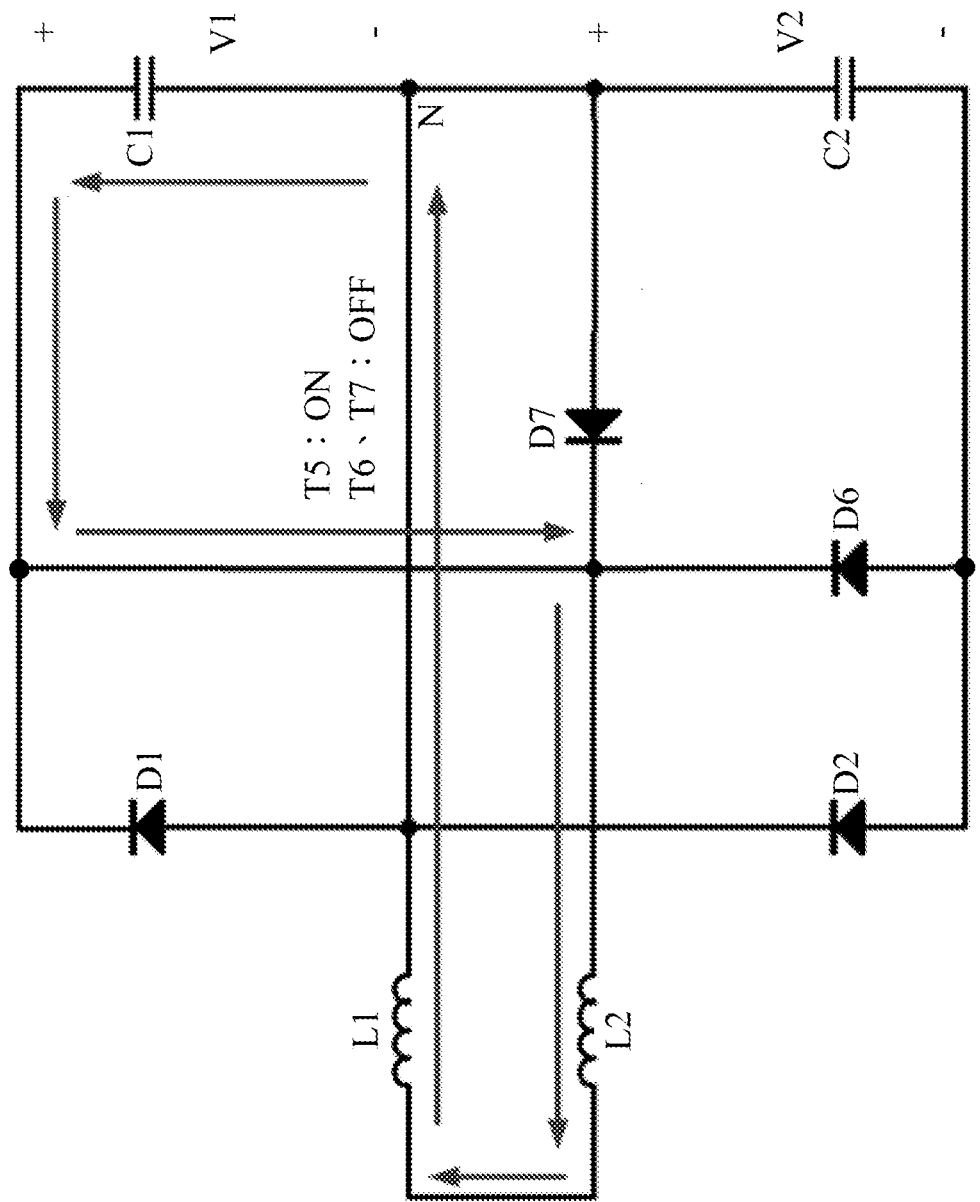
FIG. 4a illustrates an equivalent circuit diagram of the PFC circuit during a first duration when the UPS apparatus is operated under the battery supply mode according to a first embodiment of the present invention.
Figure 4B:
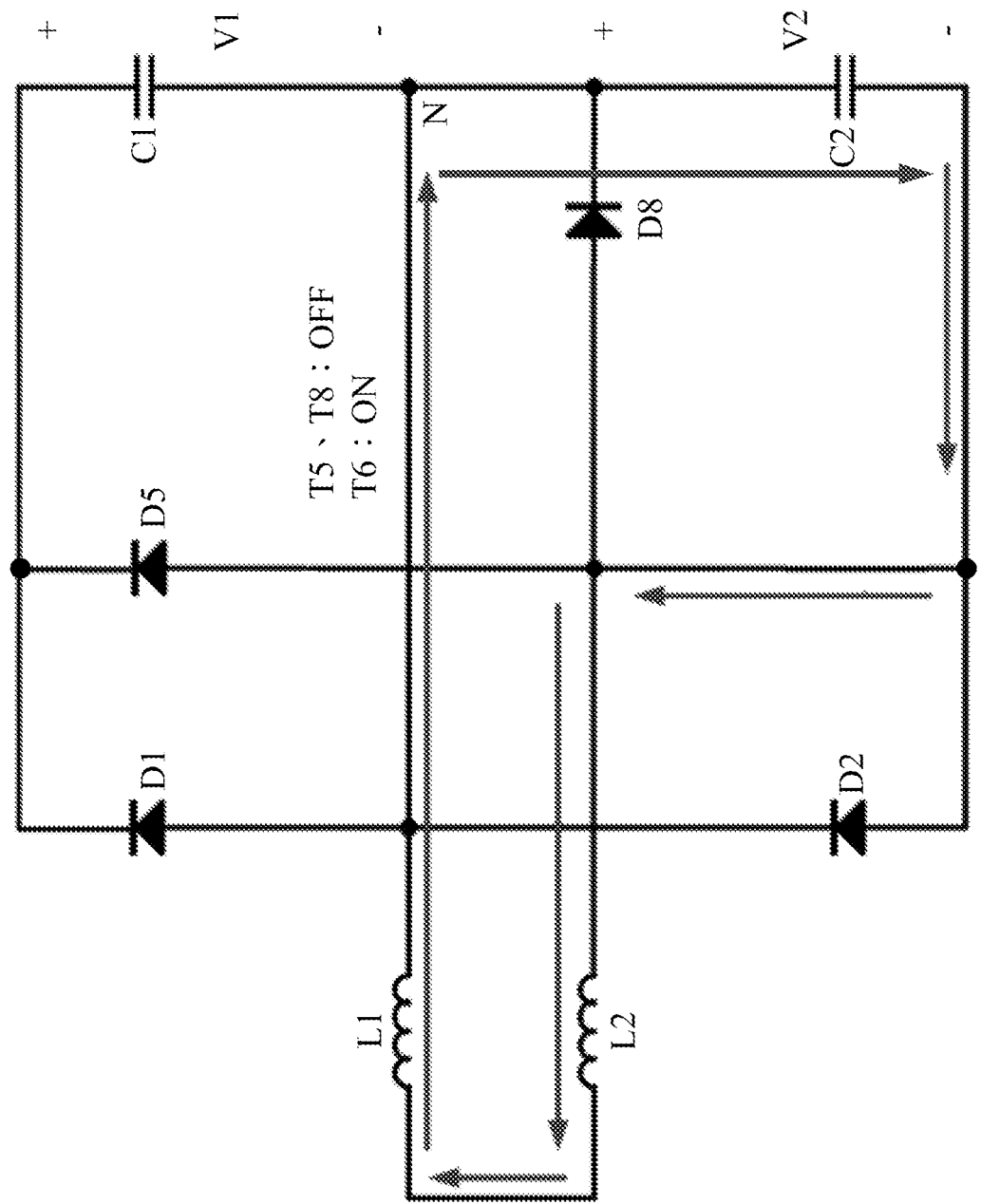
FIG. 4b illustrates an equivalent circuit diagram of the PFC circuit during a second duration when the UPS apparatus is operated under the battery supply mode according to the first embodiment of the present invention.

In a first embodiment of the present invention, the positive bus voltage V1 is larger than the negative bus voltage V2, then the first duration is controlled to be increased. FIG. 4a illustrates an equivalent circuit diagram of the PFC circuit 110 during the first duration when the UPS apparatus 100 is operated under the battery supply mode according to the first embodiment of the present invention. As shown in FIG. 4a, the first capacitor C1 releases energy, and the first inductor L1 and the second inductor L2 store the energy released from the first capacitor C1, and therefore the positive bus voltage V1 is decreased. FIG. 4b illustrates an equivalent circuit diagram of the PFC circuit 110 during the second duration when the UPS apparatus 100 is operated under the battery supply mode according to the first embodiment of the present invention. As shown in FIG. 4b, the first inductor L1 and the second inductor L2 releases energy, and the second capacitor C2 stores the energy released from the first inductor L1 and the second inductor L2, and therefore the negative bus voltage V2 is increased.

Figure 4C:
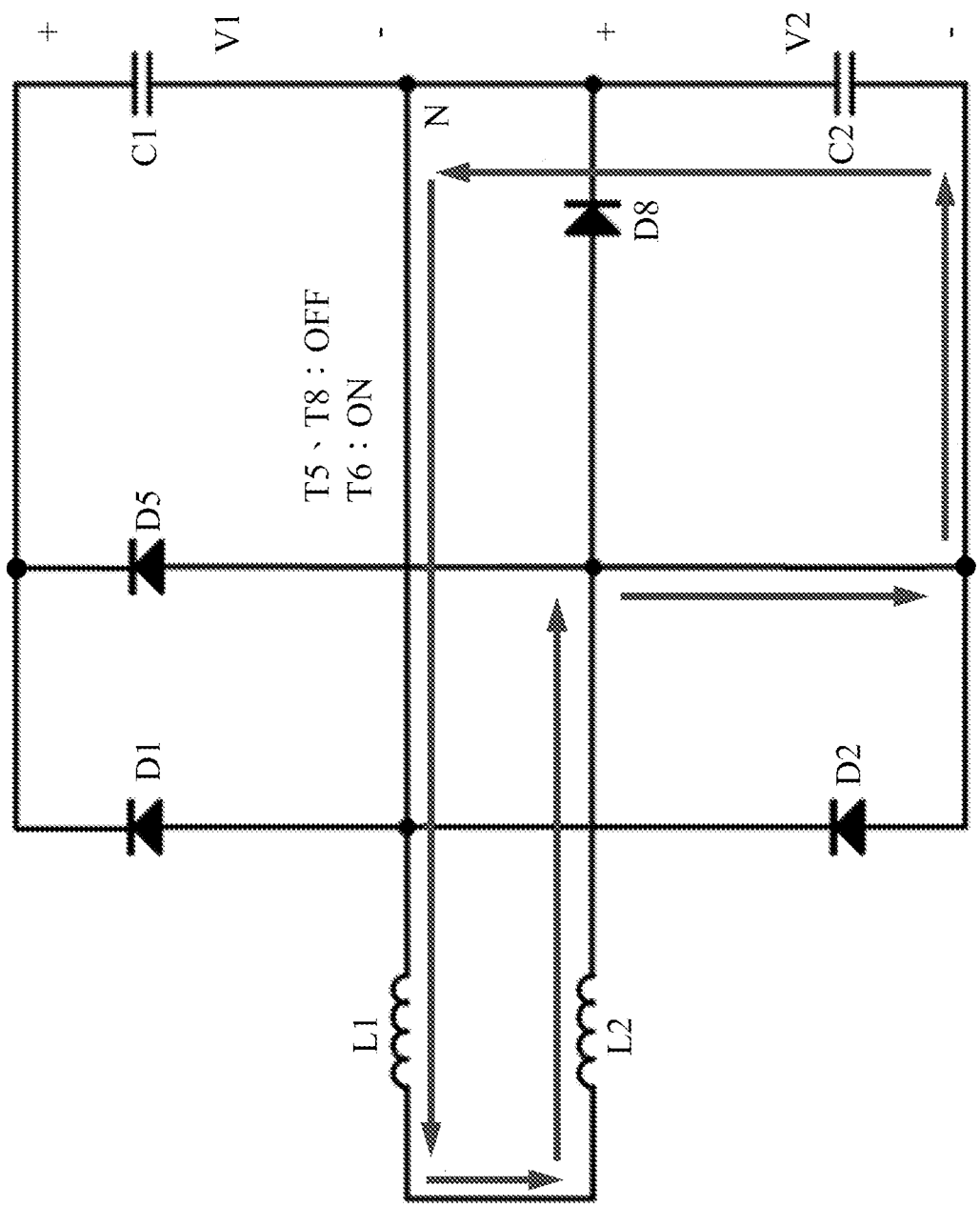
FIG. 4c illustrates an equivalent circuit diagram of the PFC circuit during the second duration when the UPS apparatus is operated under the battery supply mode according to a second embodiment of the present invention.
Figure 4D:
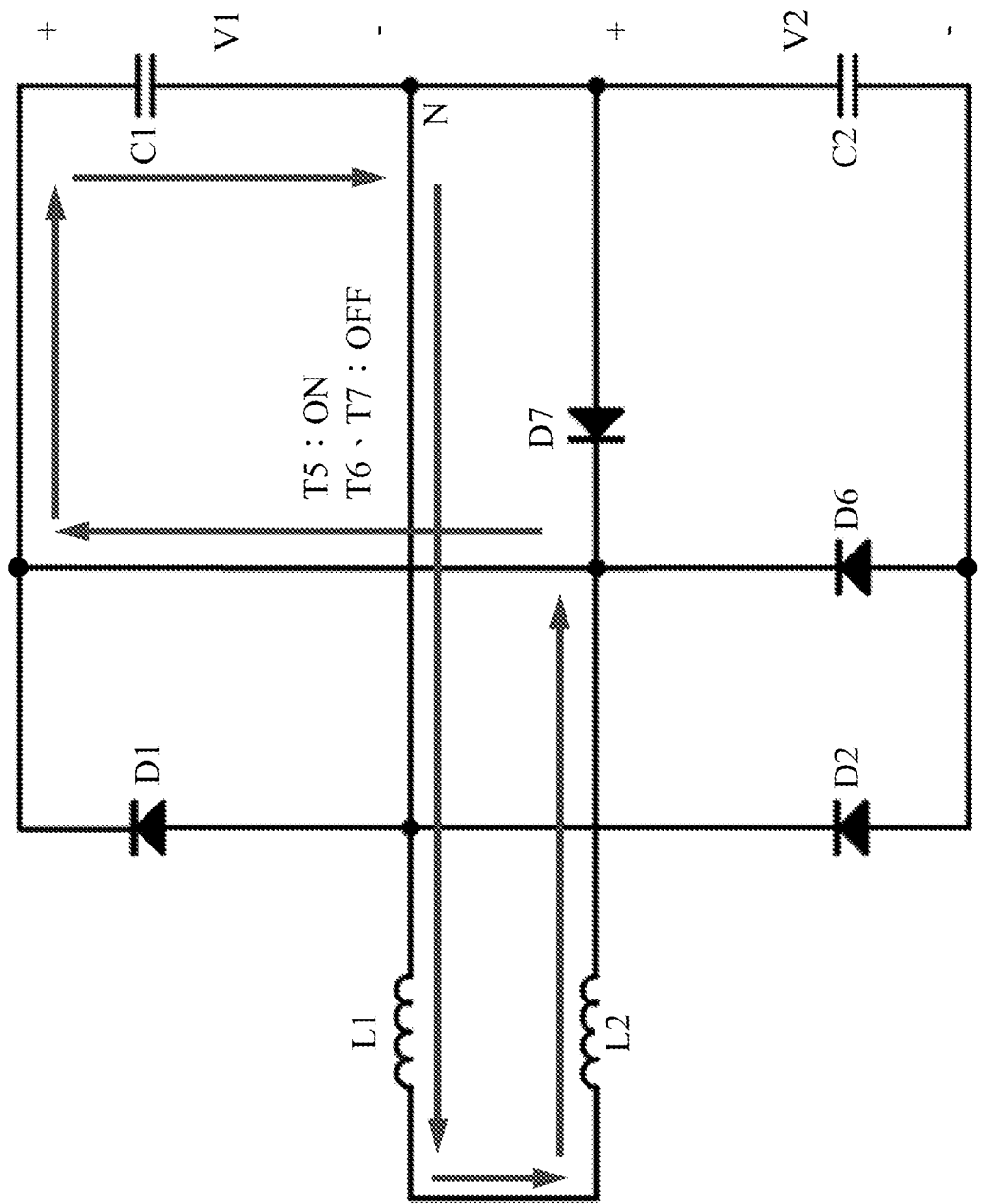
FIG. 4d illustrates an equivalent circuit diagram of the PFC circuit during the first duration when the UPS apparatus is operated under the battery supply mode according to the second embodiment of the present invention.

In a second embodiment of the present invention, the positive bus voltage V1 is less than the negative bus voltage V2, then the second duration is controlled to be increased. FIG. 4c illustrates an equivalent circuit diagram of the PFC circuit 110 during the second duration when the UPS apparatus 100 is operated under the battery supply mode according to the second embodiment of the present invention. As shown in FIG. 4c, the second capacitor C2 releases energy, and the first inductor L1 and the second inductor L2 store the energy released from the second capacitor C2, and therefore the negative bus voltage V2 is decreased. FIG. 4d illustrates an equivalent circuit diagram of the PFC circuit 110 during the first duration when the UPS apparatus 100 is operated under the battery supply mode according to the second embodiment of the present invention. As shown in FIG. 4d, the first inductor L1 and the second inductor L2 release energy, and the first capacitor C1 stores the energy released from the first inductor L1 and the second inductor L2, and therefore the positive bus voltage V1 is increased.

Therefore, a ratio of the first duration to the second duration is adjusted to balance the positive bus voltage V1 and the negative bus voltage V2 when the UPS apparatus 100 is operated under the battery supply mode. In the first embodiment of the present invention, the positive bus voltage V1 is larger than the negative bus voltage V2, and then the ratio of the first duration to the second duration is adjusted to be increased to balance the positive bus voltage V1 and the negative bus voltage V2. In the second embodiment of the present invention, the positive bus voltage V1 is less than the negative bus voltage V2, the ratio of the first duration to the second duration is adjusted to be decreased to balance the positive bus voltage V1 and the negative bus voltage V2.

As shown in FIG. 2, the PFC circuit 110 further includes a relay RL coupled between the commercial AC power supply 10 and the first and second inductors L1 and L2. When the commercial AC power supply 10 is abnormal, the UPS apparatus 100 is operated under the battery supply mode, and the relay RL of the PFC circuit 110 is controlled to be turned off. However, during a transition time for turning off the relay RL of the PFC circuit 110, the equivalent circuit as shown in FIG. 3 is not able to balance the positive bus voltage V1 and the negative bus voltage V2 instantly. Therefore, during the transition time for turning off the relay RL of the PFC circuit 110, the balance circuit 140 as shown in FIG. 1 is used for balancing the positive bus voltage V1 and the negative bus voltage V2.

Specifically, the balance circuit 140 as shown in FIG. 1 is only required to be enabled during the transition time for turning off the relay RL of the PFC circuit 110. When the UPS apparatus 100 is operated under the battery supply mode, the PFC circuit 110 is utilized for balancing the positive bus voltage V1 and the negative bus voltage V2. Therefore, the capacity of the balance circuit 140 of the present invention for balancing the positive bus voltage and the negative bus voltage could be reduced, and thus the cost for manufacturing the UPS apparatus 100 could be reduced and the power density of the UPS apparatus 100 could be increased.

Figure 5:
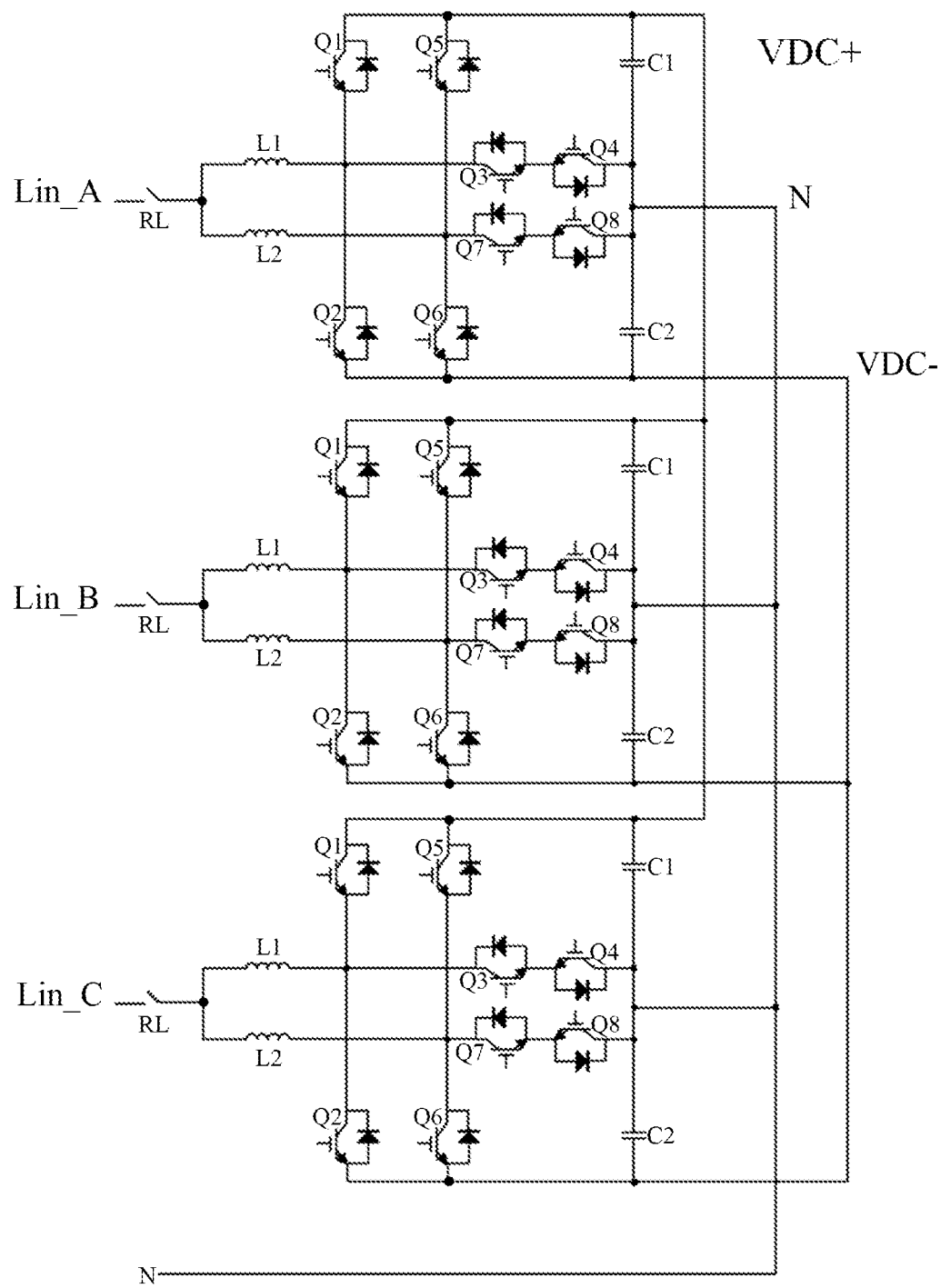
FIG. 5 illustrates a circuit diagram of a three-phase PFC circuit of the UPS apparatus according to some embodiments of the present invention.

FIG. 5 illustrates a circuit diagram of a three-phase PFC circuit of the UPS apparatus 100 according to some embodiments of the present invention. The three phase AC input voltages Lin_A, Lin_B, and Lin_C are respectively inputted into three single-phase PFC circuit as shown in FIG. 2. The method for operating the three-phase PFC circuit as shown in FIG. 5 is similar to the method for operating the single-phase PFC circuit as shown in FIG. 2, and is not described again.

From the above description, the present invention provides a method for operating an UPS apparatus and a method for operating a PFC circuit of the UPS apparatus. The PFC circuit is used for balancing the positive bus voltage and the negative bus voltage when the UPS apparatus is operated under the battery supply mode. Therefore, the cost for manufacturing the UPS apparatus could be reduced and the power density of the UPS apparatus could be increased.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for operating a power factor correction (PFC) circuit of an uninterruptible power supply (UPS) apparatus, wherein the PFC circuit includes two T-type converters, and each of the T-type converters includes four switching tubes, wherein the method comprises:
    converting AC input voltage into a positive bus voltage across a first capacitor and a negative bus voltage across a second capacitor that is connected in series with the first capacitor when the UPS apparatus is operated under a normal supply mode; and
    controlling conduction states of the switching tubes of the T-type converters to balance the positive bus voltage and the negative bus voltage when the UPS apparatus is operated under a battery supply mode;
    wherein the PFC circuit further includes a first inductor and a second inductor, wherein one end of the first inductor is electrically coupled to one of the T-type converters and the other end of the first inductor receives the AC input voltage, wherein one end of the second inductor is electrically coupled to the other one of the T-type converters and the other end of the second inductor receives the AC input voltage.

2. The method according to claim 1, wherein a first T-type converter of the T-type converters includes a first switching tube and a second switching tube which are connected in series, and a series connection of the first switching tube and the second switching tube is connected in parallel with a series connection of the first capacitor and the second capacitor, wherein the first T-type converter further includes a third switching tube and a fourth switching tube which are connected in series between the first inductor and a midpoint between the first capacitor and the second capacitor, wherein the method further comprises:

controlling the first switching tube and the second switching tube to be turned off and controlling the third switching tube and the fourth switching tube to be turned on when the UPS apparatus is operated under the battery supply mode.

3. The method according to claim 2, wherein a duration during the UPS apparatus operated under the battery supply mode includes a first duration and a second duration, wherein the method further comprises:
adjusting the first duration and the second duration to balance the positive bus voltage and the negative bus voltage when the UPS apparatus is operated under the battery supply mode.

4. The method according to claim 3, wherein a second T-type converter of the T-type converters includes a fifth switching tube and a sixth switching tube which are connected in series, and a series connection of the fifth switching tube and the sixth switching tube is connected in parallel with the series connection of the first capacitor and the second capacitor, wherein the second T-type converter further includes a seventh switching tube and an eighth switching tube which are connected in series between the midpoint and the second inductor, wherein the method further comprises:
controlling the fifth switching tube to be turned on and controlling the sixth switching tube and the seventh switching tube to be turned off during the first duration when the UPS apparatus is operated under the battery supply mode.

5. The method according to claim 4, wherein the method further comprises:
controlling the fifth switching tube and the eight switching tube to be turned off and controlling the sixth switching tube to be turned on during the second duration when the UPS apparatus is operated under the battery supply mode.

6. The method according to claim 3, wherein the method further comprises:
increasing the first duration when the positive bus voltage is larger than the negative bus voltage.

7. The method according to claim 3, wherein the method further comprises:
increasing the second duration when the positive bus voltage is less than the negative bus voltage.

8. A method for operating an uninterruptible power supply (UPS) apparatus, wherein the UPS apparatus includes a PFC circuit, a DC-DC converting circuit, and an inverter circuit coupled to the PFC circuit and the DC-DC converting circuit, wherein the PFC circuit includes two T-type converters, and each of the T-type converters includes four switching tubes, wherein the method comprises:
converting, by the PFC circuit, AC input voltage into a positive bus voltage across a first capacitor and a negative bus voltage across a second capacitor that is connected in series with the first capacitor and converting, by the inverter circuit, the positive bus voltage and the negative bus voltage into AC output voltage when the UPS apparatus is operated under a normal supply mode;
converting, by the DC-DC converting circuit, DC input voltage into the positive bus voltage and the negative bus voltage and converting, by the inverter circuit, the positive bus voltage and the negative bus voltage into the AC output voltage when the UPS apparatus is operated under a battery supply mode; and
controlling conduction states of the switching tubes of the T-type converters to balance the positive bus voltage and the negative bus voltage when the UPS apparatus is operated under the battery supply mode;
wherein the PFC circuit further includes a first inductor and a second inductor, wherein one end of the first inductor is electrically coupled to one of the T-type converters and the other end of the first inductor receives the AC input voltage, wherein one end of the second inductor is electrically coupled to the other one of the T-type converters and the other end of the second inductor receives the AC input voltage.

9. The method according to claim 8, wherein a first T-type converter of the T-type converters includes a first switching tube and a second switching tube which are connected in series, and a series connection of the first switching tube and the second switching tube is connected in parallel with a series connection of the first capacitor and the second capacitor, wherein the first T-type converter further includes a third switching tube and a fourth switching tube which are connected in series between the first inductor and a midpoint between the first capacitor and the second capacitor, wherein the method further comprises:
controlling the first switching tube and the second switching tube to be turned off and controlling the third switching tube and the fourth switching tube to be turned on when the UPS apparatus is operated under the battery supply mode.

10. The method according to claim 9, wherein a duration during the UPS apparatus operated under the battery supply mode includes a first duration and a second duration, wherein the method further comprises:
adjusting the first duration and the second duration to balance the positive bus voltage and the negative bus voltage when the UPS apparatus is operated under the battery supply mode.

11. The method according to claim 10, wherein a second T-type converter of the T-type converters includes a fifth switching tube and a sixth switching tube which are connected in series, and a series connection of the fifth switching tube and the sixth switching tube is connected in parallel with the series connection of the first capacitor and the second capacitor, wherein the second T-type converter further includes a seventh switching tube and an eighth switching tube which are connected in series between the midpoint and the second inductor, wherein the method further comprises:
controlling the fifth switching tube to be turned on and controlling the sixth switching tube and the seventh switching tube to be turned off during the first duration when the UPS apparatus is operated under the battery supply mode.

12. The method according to claim 11, wherein the method further comprises:
controlling the fifth switching tube and the eight switching tube to be turned off and controlling the sixth switching tube to be turned on during the second duration when the UPS apparatus is operated under the battery supply mode.

13. The method according to claim 10, wherein the method further comprises:
increasing the first duration when the positive bus voltage is larger than the negative bus voltage.

14. The method according to claim 10, wherein the method further comprises:
increasing the second duration when the positive bus voltage is less than the negative bus voltage.

15. The method according to claim 10, wherein the PFC circuit further includes a relay coupled between a commercial AC power supply for supplying the AC input voltage and the first and second inductors, wherein the method further comprises:
  turning off the relay when the UPS apparatus is operated under the battery supply mode.

16. The method according to claim 15, wherein the UPS apparatus further includes a balance circuit coupled to the PFC circuit, the DC-DC converting circuit and the inverter circuit, wherein the method further comprises:
  balancing the positive bus voltage and the negative bus voltage via the balance circuit during a transition time for turning off the relay.

* * * * *